United States Patent
Smetana et al.

(10) Patent No.: US 8,202,170 B2
(45) Date of Patent: Jun. 19, 2012

(54) BI-DIRECTIONAL CLUTCH WITHOUT ROLLER ELEMENTS

(75) Inventors: Tomas Smetana, Erlangen (DE); Brian Lee, York, SC (US)

(73) Assignee: Schaeffler KG, Herzogenaurach (DE)

( * ) Notice: Subject to any disclaimer, the term of this patent is extended or adjusted under 35 U.S.C. 154(b) by 303 days.

(21) Appl. No.: 12/604,133

(22) Filed: Oct. 22, 2009

(65) Prior Publication Data

US 2010/0126817 A1  May 27, 2010

Related U.S. Application Data

(60) Provisional application No. 61/116,932, filed on Nov. 21, 2008.

(51) Int. Cl.
*F16D 3/76* (2006.01)
(52) U.S. Cl. ......................................................... 464/78
(58) Field of Classification Search .................. 464/30, 464/37, 41, 77, 78, 160; 192/37, 39
See application file for complete search history.

(56) References Cited

U.S. PATENT DOCUMENTS

| | | | | |
|---|---|---|---|---|
| 3,373,625 A | * | 3/1968 | Keller | 464/77 X |
| 4,772,245 A | * | 9/1988 | Readman et al. | 464/160 X |
| 5,823,499 A | * | 10/1998 | Ito et al. | 464/160 X |
| 6,409,001 B1 | | 6/2002 | Kerr | 192/44 |
| 6,508,140 B2 | * | 1/2003 | Zaps | 464/37 X |
| 2008/0188315 A1 | * | 8/2008 | Bosserdet | 464/30 |
| 2011/0000755 A1 | * | 1/2011 | Smetana et al. | 192/45 |

FOREIGN PATENT DOCUMENTS

GB  1132649  * 11/1968 ............. 464/77

* cited by examiner

*Primary Examiner* — Gregory Binda
(74) *Attorney, Agent, or Firm* — Fitzpatrick, Cella, Harper & Scinto

(57) ABSTRACT

Example aspects of the present invention broadly comprise at least two concentric rings with complementary ramped surfaces, at least one of the rings being rotatable relative to another one of the rings so that contact is made at the ramped surfaces. The complementary ramped surfaces form respective circumferences of the rings. At least one of the ramped surfaces may have a sinusoidal profile, or a profile forming at least one of a straight line, concave, or convex. In some example embodiments of the invention, a first one of the rings is a coupling member and a second one of the rings is a tubular slipper with a friction surface radially opposite of the ramped surface. The tubular slipper is arranged to radially expand or contract upon contacting the coupling member.

17 Claims, 5 Drawing Sheets

BI-DIRECTIONAL CLUTCH WITHOUT ROLLER ELEMENTS

FIELD OF THE INVENTION

This application claims the benefit of provisional U.S. Application No. 61/116,932, filed Nov. 21, 2008, which is hereby incorporated by reference, as if set forth fully herein.

BACKGROUND OF THE INVENTION

U.S. Pat. No. 6,409,001 (Kerr), hereby incorporated by reference in its entirety as if set forth fully herein, discloses a multi-directional coupling including a tubular slipper, a tubular member, a race, and roller members disposed in a channel defined by the tubular slipper and the tubular member. Torque applied to the member forces the rollers to roll up the side walls of the channels, forcing the slipper to radially expand, thereby increasing the radial force exerted on the slipper against the race. As more torque is applied to the member, the slipper and the race will become rotationally locked to the member.

Kerr is limited in that it includes rollers. Rollers occupy valuable radial space in the coupling. Furthermore, rollers add expense. Thus, there is a long-felt need for a multi-directional coupling without roller elements.

BRIEF SUMMARY OF THE INVENTION

Example aspects of the present invention broadly comprise at least two concentric rings with complementary ramped surfaces, at least one of the rings being rotatable relative to another one of the rings so that contact is made at the ramped surfaces. The complementary ramped surfaces extend from respective circumferences of the rings. At least one of the complementary ramped surfaces may have a sinusoidal profile, or a straight line, concave, or convex profile.

In some example embodiments of the invention, a first one of the rings is a coupling member and a second one of the rings is a tubular slipper with a friction surface radially opposite of the ramped surface. The tubular slipper is arranged to radially expand or contract upon contacting the coupling member. In an example embodiment of the invention, the profile provides an optimum strut angle to lock the coupling. In some example embodiments of the invention, the tubular slipper includes at least one axial slit, the slit permitting varying slipper diameters.

Other example aspects of the present invention broadly comprise at least one first slipper ring with a first ramp profile and at least one second slipper ring with a second ramp profile. The at least one second ramp profile is complementary to and arranged to become in mating engagement with the first ramp profile. A circumference of the first slipper ring is discontinuous. In some example embodiments of the invention, at least one of the first ramp profile and the second ramp profile forms at least one of an involute, an arc, and an angled slope. In some example embodiments of the invention, relative rotation between the first slipper ring and the second slipper ring adjusts the circumference of the first slipper ring.

Some example embodiments of the invention include a friction ring. In an example embodiment of the invention, adjustment of the circumference engages the first slipper ring with the friction ring by increasing the circumference to expand the first slipper ring against an inner diameter of the friction ring. In another example embodiment of the invention, adjustment of the circumference decreases the circumference to contract the first slipper ring against an outer diameter of the friction ring.

BRIEF DESCRIPTION OF THE DRAWINGS

The nature and mode of operation of the present invention will now be more fully described in the following detailed description of the invention taken with the accompanying drawing figures.

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
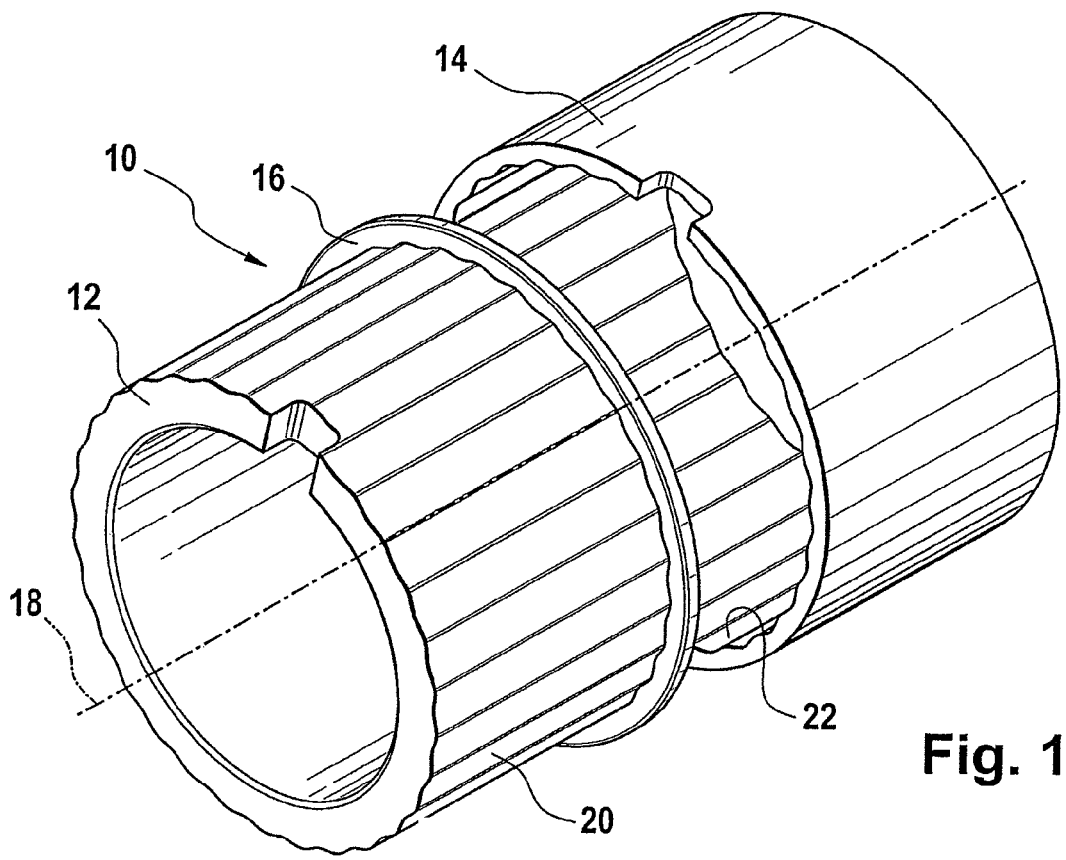
FIG. 1 is a perspective view of a coupling design according to an example aspect of the invention.

The following description is made with reference to FIG. 1. FIG. 1 is a perspective view of a coupling design according to an example aspect of the invention. Coupling (also referred to as a "slipper clutch") 10 includes rings 12 and 14. Coupling 10 may also include optional retaining ring 16, although it is not required in other embodiments After ring 12 is axially aligned with ring 14, retaining ring 16 may be installed onto ring 12 to prevent axial displacement of ring 12 relative to ring 14 along axis 18. After installation, rings 12 and 14 are concentric. That is, rings 12 and 14 share common axis 18.

Figure 2:
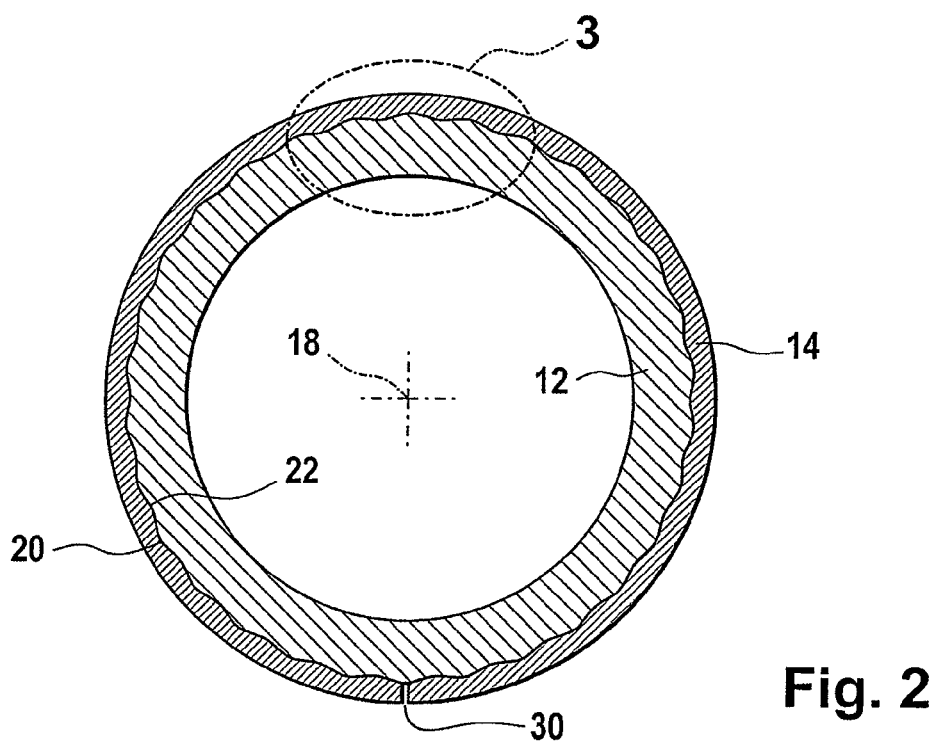
FIG. 2 is a section view of a coupling design according to an example aspect of the invention.

The following description is made with reference to FIGS. 1 and 2. FIG. 2 is a section view of a coupling design according to an example aspect of the invention. Rings 12 and 14 include ramped surfaces 20 and 22, respectively, wherein surface 20 forms an outer surface of ring 12 and surface 22 forms an inner surface of ring 14 that faces an inner bore formed by the ring 14. Surfaces 20 and 22 are complementary.

That is, ramped surface 20 on ring 12 mates with ramped surface 22 on ring 14. Ramped surface 20 contacts ramped surface 22 when ring 14 is rotated relative to ring 12 about axis 18 (or vice versa). That is, ramped surfaces 20 and 22 make contact when ring 14 is rotated relative to ring 12 (or vice versa). In an example embodiment of the invention, ramped surfaces 20 and 22 extend around the circumferential surface of rings 12 and 14, respectively.

Figure 3A:
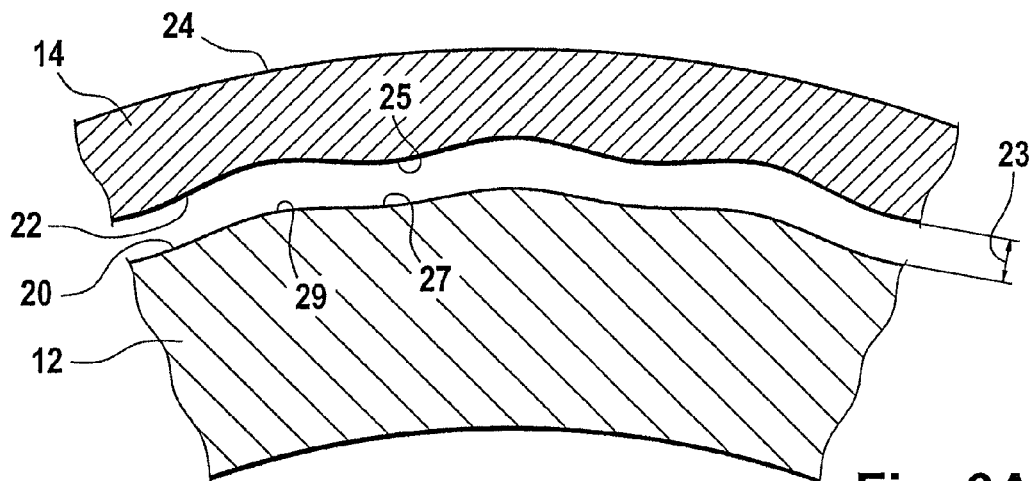
FIG. 3A is a detail view of encircled region 3 in FIG. 2 with a radial gap shown between the rings for clarity.

The following description is made with reference to FIG. 3A. FIG. 3A is a detail view of encircled region 3 in FIG. 2 with radial gap 23 shown between the rings for clarity. In one example embodiment of the invention, ramped surfaces 20 and 22 each have a sinusoidal profile. Although sinusoidal profiles are shown, profiles 20 and 22 may be straight lines forming a peak, fines with an angled slope, concave and convex arcs, involute or any other arcuate form, another suitable shape with a varying radius, or any combination thereof. In an example embodiment of the invention, ring 12 is a coupling member and ring 14 is a tubular slipper having outer friction surface 24 radially opposite of ramped surface 22.

Figure 3B:
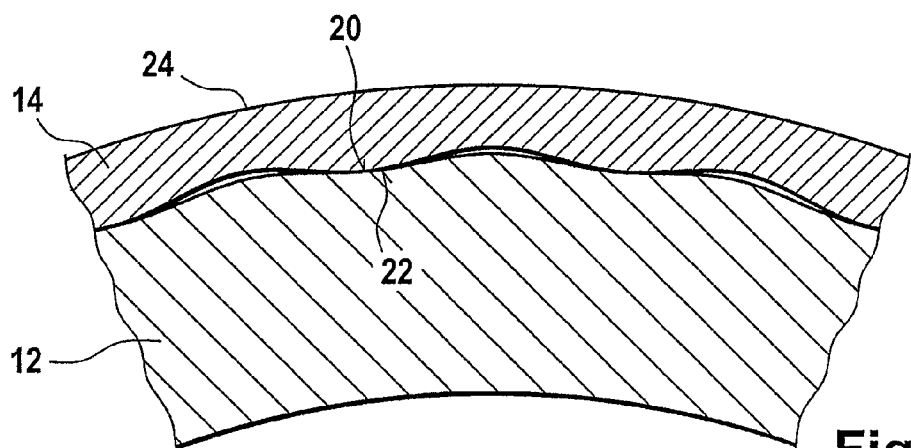
FIG. 3B is a detail view of encircled region 3 in FIG. 2 with the coupling shown in a freewheel state.
Figure 3C:
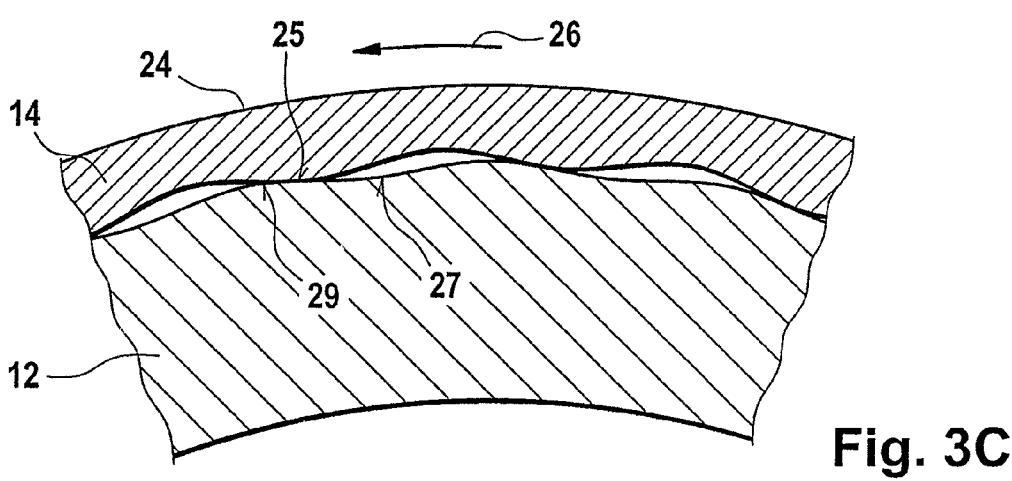
FIG. 3C is a detail view of encircled region 3 in FIG. 2 with the coupling shown in a locked state.

The following description is made with reference to FIGS. 3A-3C. FIG. 3B is a detail view of encircled region 3 in FIG. 2 with coupling 10 shown in a freewheel state. FIG. 3C is a detail view of encircled region 3 in FIG. 2 with coupling 10 shown in a locked state. Tubular slipper 14 is arranged to radially expand upon contacting coupling member 12. For example, FIG. 3B depicts coupling 10 in a freewheel state. The profiles of surfaces 22 and 24 as shown in FIG. 3B are circumferentially aligned so that peak 25 of profile 22 rests in valley 27 of profile 20. Alternatively stated, in the freewheel state the concave and convex portions of the profile of surface 20 and the convex and concave portions of the profile of surface 22, respectively, are aligned so that the outer diameter of slipper 14 (formed by the surface 24) is in a non-engaged or contracted (minimized) state. In some embodiments of the invention (not shown), a pin or other feature prevents relative rotation of slipper 14 relative to member 12, preventing engagement of coupling 10.

Figure 3D:
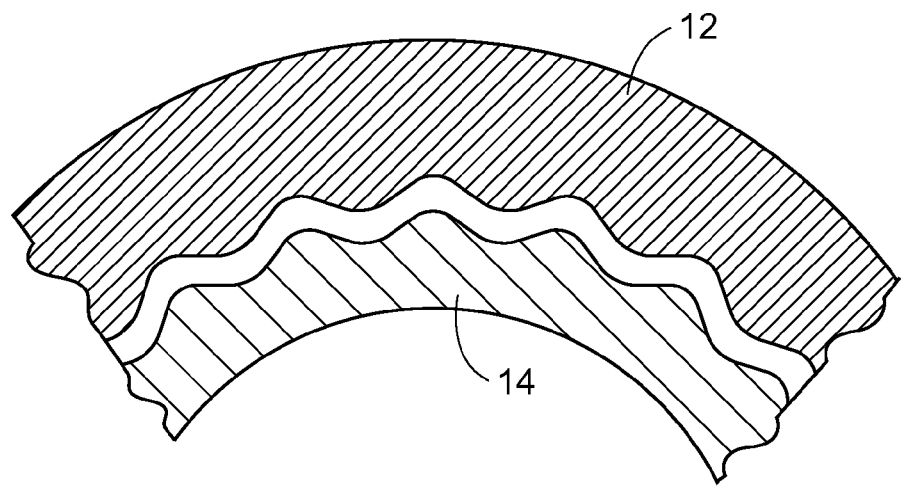
FIG. 3D is a detailed view of a section of an embodiment of a coupling.
Figure 3E:
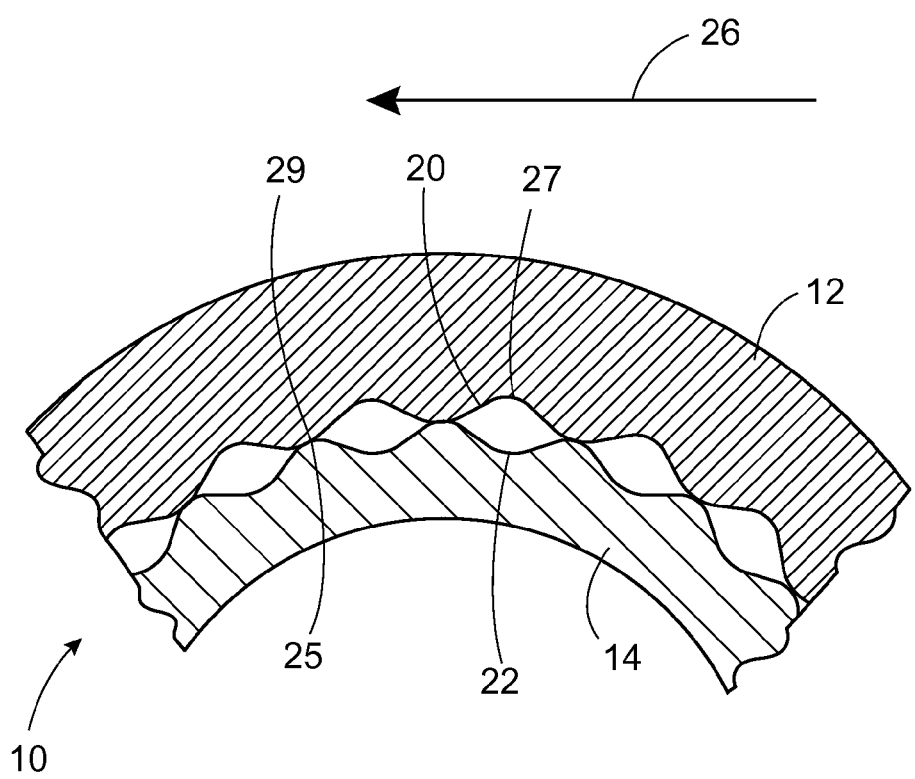
FIG. 3E is a detailed view of the section of FIG. 3D with the coupling shown in a locked state.

FIG. 3C depicts coupling 10 in a locked state. Ring 14 is rotated in direction of arrow 26. Peak 25 of ramped surface 22 is approaching peak 29 of ramped surface 20, causing radial expansion of slipper 14, thereby increasing (expanding) the diameter of friction surface 24. In an example embodiment of the invention shown in FIG. 3D, tubular slipper 14 is disposed within coupling member 12 and arranged to radially contract upon contacting coupling member 12. For example, as shown in FIG. 3E, when ring 14 rotates in direction of arrow 26, peak of ramped surface 22 approaches peak 29 of ramped surface 20, forcing slipper 14 radially inward, thereby decreasing (contracting) the diameter of an inner friction surface of ring 14.

Figure 4:
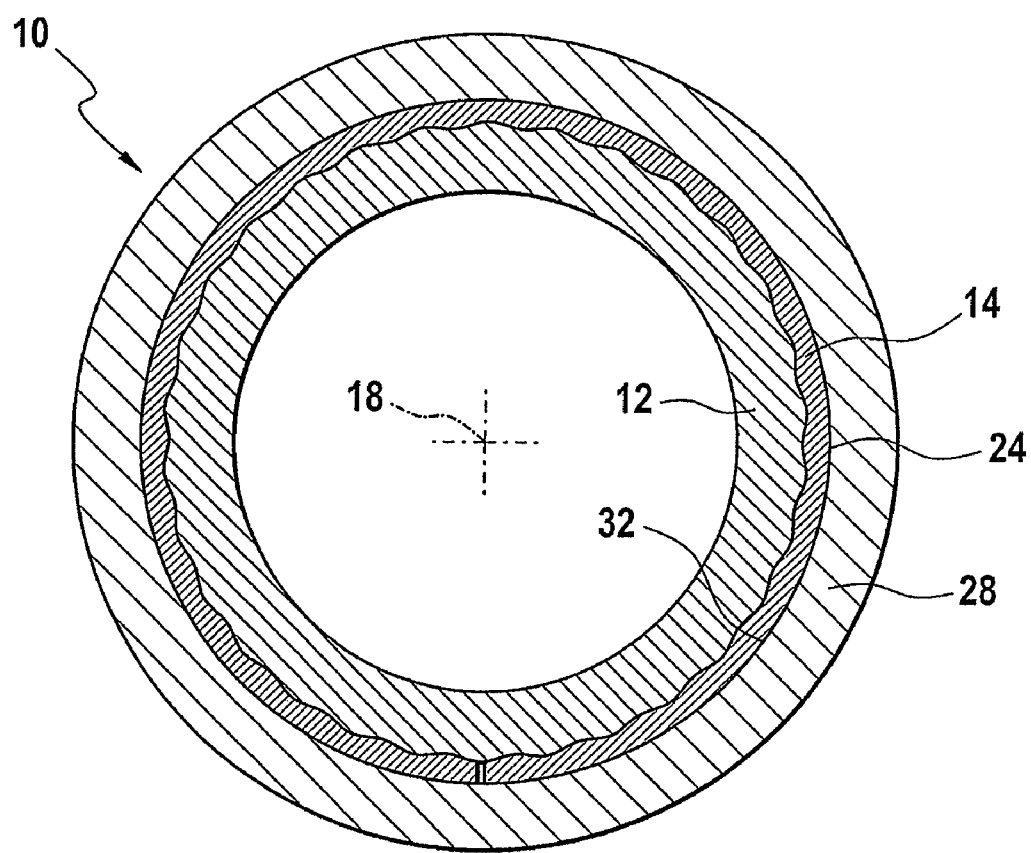
FIG. 4 is a section view of a coupling design according to an example aspect of the invention disposed within further a outer ring.

The following description is made with reference to FIG. 4. FIG. 4 is a section view of a coupling design according to an example aspect of the invention disposed within further outer ring 28. Coupling 10 is disposed within further outer ring 28 and relative rotation of ring 14 relative to ring 12, and resulting diameter increase of surface 24, frictionally locks coupling 10 with further outer ring 28.

Also according to an example embodiment of the invention, the profiles of surfaces 20 and 22 are configured to provide an optimum strut angle to lock the coupling. For example, a sinusoidal and/or ramp profile can be selected to maximize radially outwardly directed force exerted by friction surface 24 to friction ring 28, while minimizing a tendency for rings 12 and 14 to become frictionally locked preventing release of coupling 10. The contact angle (or strut angle) between surfaces 20 and 22 of rings 12 and 14, respectively, controls the amount of rotational force that is redirected as radial force when the rings are rotated relative to one another. Friction between mating surfaces 20 and 22 can oppose release of coupling 10 if the friction force between the mating surfaces is higher than the friction force between friction surface 24 and a mating circumferential surface, surface 32 of ring 28, for example. Therefore, the contact angle must be selected to be shallow enough so that friction from a slight interference fit between friction ring 28 and surface 24 of ring 14 is sufficient to begin engagement of coupling 10, but steep enough to prevent surfaces 20 and 22 from becoming frictionally locked, preventing disengagement of coupling 10.

In an example embodiment of the invention, tubular slipper 14 includes axial slit 30 permitting varying slipper diameters. Slipper clutch 10 includes slipper ring 14 with ramped surface 22. Clutch 10 further includes ring 12 with ramped surface 20. The profile of surface 20 is complementary to and in mating engagement with ramped surface 22. The circumference of ring 14 is discontinuous at slit 30 (FIG. 2), for example. One or both of those profiles may he an involute, an arc, or an angled slope.

Figure 5:
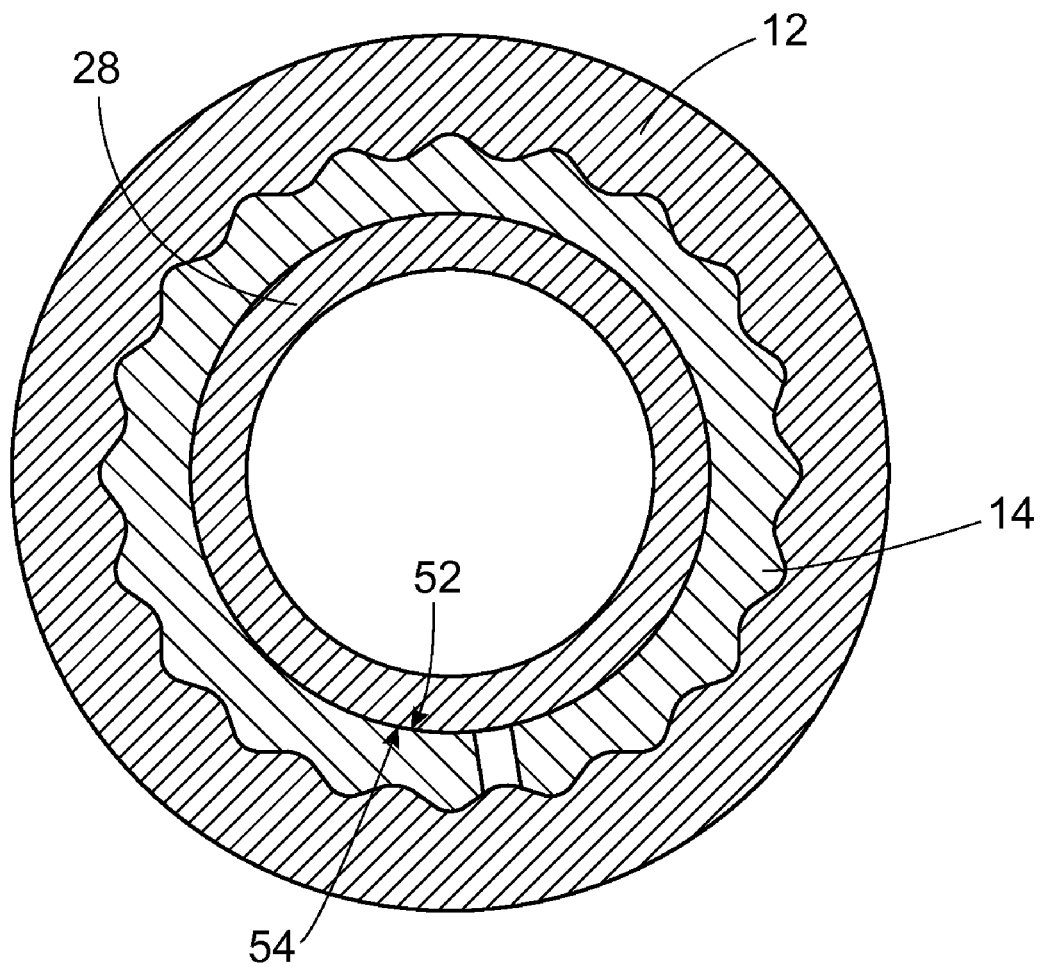
FIG. 5 is a detailed view of an embodiment of a coupling disposed around a further inner ring according to an example aspect of the invention.

In operation, rotation of slipper ring 14 relative to ring 12 (or vice versa) adjusts circumference of the surface 24 of slipper ring 14. Slipper clutch 10 may also include optional friction ring 28, with inner circumferential surface 32 disposed adjacent surface 24. When friction ring 28 is present, adjustment of surface 24 in the above manner engages slipper ring 14 with friction ring 28. That is the adjustment increases the circumference of surface 24 to expand slipper ring 14 against inner circumferential surface 32 of friction ring 28. In another example embodiment shown in FIG. 5, friction ring 28 is disposed within slipper ring 14 and the adjustment decreases an inner circumference of surface 54 of the slipper ring 14 to contract slipper ring 14 against an outer circumferential surface 52 of friction ring 28.

Although the foregoing description described slipper ring 14 disposed radially around the ring 12, the scope of the present invention is not limited to that configuration only, and broadly construed, alternatively can also include ring 14 disposed radially inside of ring 12.

In that case, ring 14 can radially contract to lock an inner circumferential surface of ring 14 to friction ring 28.

The disclosed coupling is described without roller elements. Rollers add expense and occupy radial space. Elimination of the rollers reduces manufacturing and assembly costs and improves durability of the components. Furthermore, a contact radius between ring 12 and slipper ring 14 is moved radially out when compared to a contact radius between a roller and an inner ring. That is, for the same diameter of surface 24 of slipper ring 14, a design with rollers must move a contact radius between ring 14 and the rollers radially in to accommodate for the added radial space occupied by the roller body. As torque is a function of radius, the inventive design allows the same torque transmission with lower forces.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:
1. A coupling comprising:

at least two concentric rings with complementary ramped surfaces, at least one of the rings being rotatable relative to another one of the rings so that contact is made at the complementary ramped surfaces, wherein a first ring of the concentric rings is a coupling member and a second ring of the concentric rings is a tubular slipper, wherein the second ring has a friction surface radially opposite of the ramped surface of the second ring, wherein the friction surface of the second ring is constructed to radially expand or contract in response to contact between the ramped surface of the first ring and the ramped surface of the second ring.

2. The coupling of claim 1, wherein the complementary ramped surfaces form respective circumferences of the rings.

3. The coupling of claim 1, wherein at least one of the complementary ramped surfaces has a sinusoidal profile.

4. The coupling of claim 3, wherein the profile has a strut angle to lock the coupling, wherein the strut angle of the profile maximizes radially directed forces exerted by the friction surface of the second ring, and the strut angle of the profile minimizes frictional locking forces between the first ring and the second ring.

5. The coupling of claim 4, wherein the strut angle of the profile maximizes radially outwardly directed forces exerted by the friction surface of the second ring.

6. The coupling of claim 1, wherein at least one of the ramped surfaces has a profile that is formed of at least one of a flat plane, a concave curved plane, and a convex curved plane.

7. The coupling of claim 1, wherein at least one axial slit is formed in the tubular slipper, wherein the slit is dimensioned to permit varying slipper diameters.

8. The coupling of claim 1, wherein the first ring is an inner ring and the second ring is an outer ring.

9. A slipper clutch device comprising:
a coupling comprised of:
at least one first slipper ring comprising a first ramp profile, and
at least one second slipper ring comprising a second ramp profile, wherein the second ramp profile is complementary to and arranged to become in mating engagement with the first ramp profile; wherein the first slipper ring is discontinuous, wherein relative rotation between the first slipper ring and the second slipper ring adjusts an outer circumference of an outer circumferential surface of the first slipper ring, and wherein the outer circumferential surface of the first slipper ring has a friction surface.

10. The slipper clutch device of claim 9, wherein at least one of the first ramp profile and the second ramp profile is formed of at least one of an involute, an arc, and an angled slope.

11. The slipper clutch device of claim 9, further comprising a friction ring constructed for mating engagement with the friction surface of the first slipper ring of the coupling.

12. The slipper clutch device of claim 11, wherein adjustment of the outer circumference of the first slipper ring engages the first slipper ring with the friction ring.

13. The slipper clutch device of claim 12, wherein adjustment of the outer circumference of the first slipper ring increases the outer circumference of the first slipper ring to expand the first slipper ring against an inner circumferential surface of the friction ring.

14. A slipper clutch device comprising:
a coupling comprised of:
at least one first slipper ring comprising a first ramp profile, and
at least one second slipper ring comprising a second ramp profile, wherein the second ramp profile is complementary to and arranged to become in mating engagement with the first ramp profile, wherein the first slipper ring is discontinuous, wherein relative rotation between the first slipper ring and the second slipper ring adjusts an inner circumference of an inner circumferential surface of the first slipper ring, and wherein the inner circumferential surface of the first slipper ring has a friction surface.

15. The slipper clutch device of claim 14, further comprising a friction ring constructed for mating engagement with the friction surface of the first slipper ring.

16. The slipper clutch device of claim 15, wherein adjustment of the inner circumference of the first slipper ring engages the first slipper ring with the friction ring.

17. The slipper clutch device of claim 16, wherein adjustment of the inner circumference of the first slipper ring reduces the inner circumference of the first slipper ring to contract the first slipper ring against an outer circumferential surface of the friction ring.

* * * * *